United States Patent

Kim et al.

Patent Number: 5,946,200
Date of Patent: *Aug. 31, 1999

[54] CIRCULATING CURRENT FREE TYPE HIGH FREQUENCY SOFT SWITCHING PULSEWIDTH MODULATED FULL BRIDGE DC/DC CONVERTER

[75] Inventors: Eun Soo Kim; Kee Yeon Joe, both of Kyongsangnam Do; Moon Ho Kye, Pusan, all of Rep. of Korea

[73] Assignee: Korea Electrotechnology Research Institute, Kyongsangnam Do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/757,912

[22] Filed: Nov. 27, 1996

[30] Foreign Application Priority Data

Dec. 2, 1995 [KR] Rep. of Korea ............ 95-46168

[51] Int. Cl.$^6$ .......................... H02M 3/335; H02M 3/24; H02M 7/5387

[52] U.S. Cl. ..................... 363/17; 363/98; 363/132

[58] Field of Search ............... 363/17, 98, 132

[56] References Cited

U.S. PATENT DOCUMENTS

| | | | |
|---|---|---|---|
| 4,953,068 | 8/1990 | Henze | 363/17 |
| 5,065,301 | 11/1991 | Shioya et al. | 363/17 |
| 5,132,889 | 7/1992 | Hitchcock et al. | 363/17 |
| 5,157,592 | 10/1992 | Walters | 363/17 |
| 5,198,969 | 3/1993 | Redl et al. | 363/17 |
| 5,235,501 | 8/1993 | Stuart et al. | 363/17 |
| 5,325,283 | 6/1994 | Farrington et al. | 363/21 |
| 5,418,703 | 5/1995 | Hitchcock et al. | 363/17 |
| 5,442,540 | 8/1995 | Hua et al. | 363/98 |
| 5,444,594 | 8/1995 | Tanaka et al. | 361/58 |
| 5,479,337 | 12/1995 | Voigt | 363/131 |
| 5,485,365 | 1/1996 | Dan-Harry | 363/132 |

FOREIGN PATENT DOCUMENTS

| | | | |
|---|---|---|---|
| 54-114166 | 9/1979 | Japan | H03K 17/56 |
| 63-37584 | 7/1988 | Japan . | |
| 459833 | 5/1973 | U.S.S.R. | H02M 7/12 |

OTHER PUBLICATIONS

"A 500 KHz Multi–Output Converter With Zero Voltage Switching" by Dhaval B. Dalal; APEC 1990; (pp. 265–274).
"Improved Non–Dissipative Snubber Design for Buck Regulators and Current–Fed Inverters" by L.G. Meares; Power Concepts, Inc. 1982; (pp. 1–8).
"PWM DC–DC Converter With a Resonant Commutation Means" by S. Atoh; H. Yoshiike and Y. Sekino; INTELEC Nov. 1991; (pp. 308–313).
"Saturable Reactor Assisted Soft–Switching Technique in PWM DC–DC Converters" by S. Hamada, Y. Maruyama and M. Nakaoka; PESC 1992; (pp. 93–100).
"Using a Tapped Inductor for Reducing Conduction Losses in a Soft–Switching PWM DC–DC Converter" by S. Hamada, M. Michihira and M. Nakaoka; EPE 1993; (pp. 130–134).

*Primary Examiner*—Peter S. Wong
*Assistant Examiner*—Bao Q. Vu
*Attorney, Agent, or Firm*—Flynn, Thiel, Boutell & Tanis, P.C.

[57] ABSTRACT

An improved soft switching topology of a full bridge PWM DC/DC converter is described. The new topology employs an energy recovery snubber to minimize a circulating current flowing through the transformer and switching devices. By using an energy recovery snubber instead of adding a tapped inductor and a saturable reactor to reduce RMS current stress, the converter achieves nearly zero current switching for the right leg of the full bridge circuit due to the minimized circulating current, and achieves zero voltage switching for the left leg of the full bridge circuit due to the reflected output current during the interval of left leg transition. The converter achieves soft switching for secondary side rectifier and freewheeling diode because at the turn-on time of the primary switching device, the energy recovery snubber provides a low impedance path.

8 Claims, 12 Drawing Sheets

CIRCULATING CURRENT FREE TYPE HIGH FREQUENCY SOFT SWITCHING PULSEWIDTH MODULATED FULL BRIDGE DC/DC CONVERTER

FIELD OF THE INVENTION

This invention relates to a high frequency soft switching phase-shifted full bridge DC/DC converter free from a circulating current flowing through the transformer and switching devices. The DC/DC converter would be applied to the main unit of the power supply in a battery charger of a telecommunication system, etc.

BACKGROUND OF THE INVENTION

Recently, many new techniques for high-frequency conversion have been proposed to reduce the voltage and current stress to the component, and the switching losses in the traditional pulsewidth-modulated (PWM) converter. Among them, the phase-shifted full-bridge (FB) zero-voltage-switched PWM techniques (Dhaval B. Dalal, "A 500 KHz Multi-Output Converter with Zero Voltage Switching", APEC, 1990) are deemed most desirable for many applications because this topology permits all switching devices to operate under zero-voltage-switching (ZVS) by using circuit parasitic characteristics such as transformer leakage inductance and power device junction capacitance.

The conventional high frequency phase-shifted full bridge DC/DC converter has a disadvantage that the circulating current flows through transformer and switching devices during the freewheeling interval. The RMS current stress and conduction losses of transformer and switching devices are increased by this circulating current.

This invention solves these problems by attaching an energy recovery snubber (ERS or ERS1) to the secondary side of the transformer in the DC/DC converter. The energy recovery snubber (ERS or ERS1) of this invention has three fast recovery diodes $Ds_1$, $Ds_2$ and $DS_3$, two resonant capacitors $Cs_1$ and $Cs_2$, and a small resonant inductor Lr which can be ignored because the transformer leakage inductance $L_l$ is used instead of inserting the resonant inductor Lr.

Figure 1:
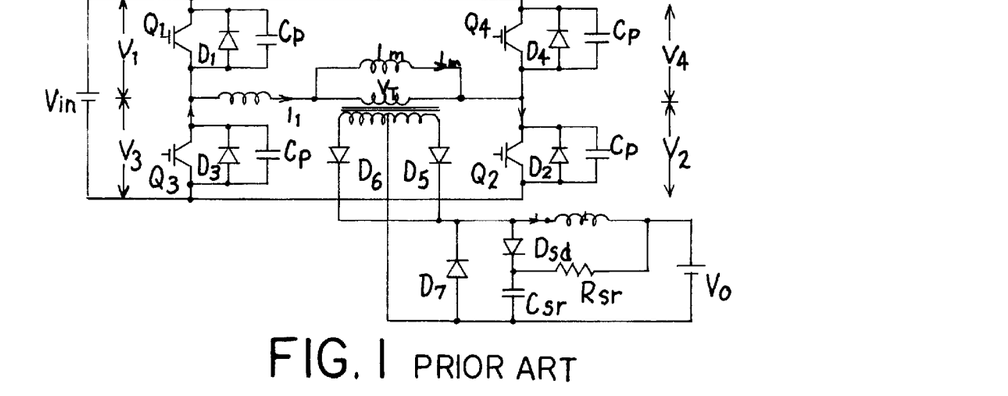
FIG. 1 shows a schematic circuit of a prior art full bridge DC/DC converter.
Figure 2:
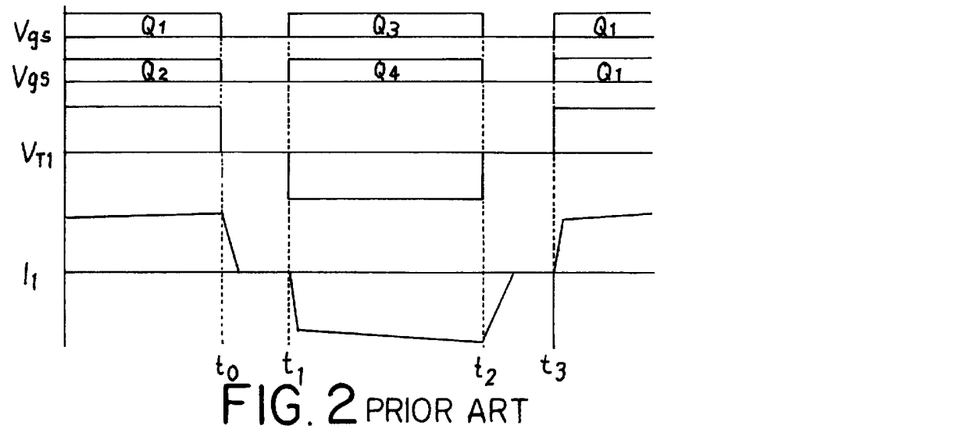
FIG. 2 shows the wave forms of the hard-switching full bridge converter with regular PWM of FIG. 1.
Figure 3:
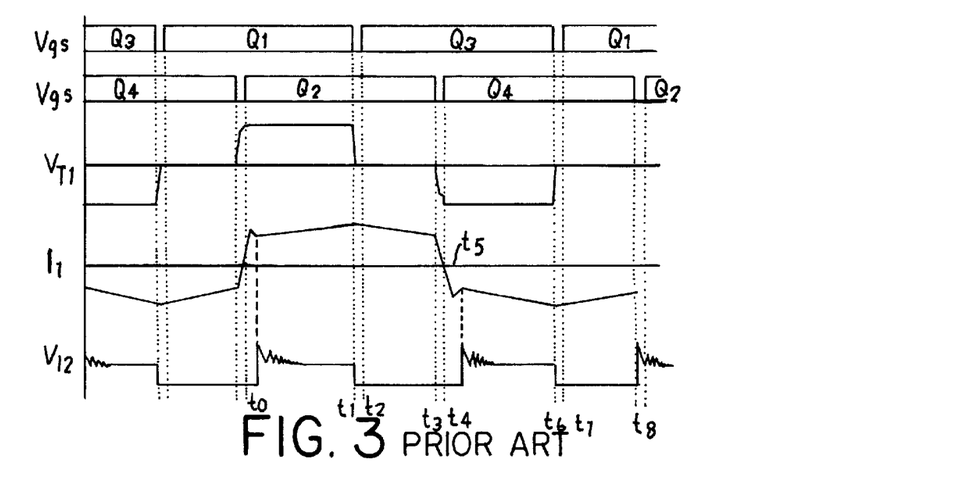
FIG. 3 shows the wave forms of phase-shifted FB DC/DC converter according to FIG. 1.

FIG. 1 shows a prior art full bridge DC/DC converter schematic circuit and relevant wave-forms thereof are shown in FIG. 2 and FIG. 3. The circuit includes parasitic elements such as body diodes $D_1$, $D_2$, $D_3$ and $D_4$, junction capacitance Cp across each switching device, leakage inductance $L_l$, and magnetizing inductance Lm of the transformer. In the case of regular PWM control, shown in FIG. 2, until the time at $t_0$, the energy is delivered from the source to the load through switches $Q_1$ and $Q_2$. When the switches $Q_1$ and $Q_2$ are turned off, the load current $I_0$ flows through rectifiers $D_5$ and $D_6$ during the freewheeling interval $t_0$–$t_1$ or $t_2$–$t_3$. Then, the transformer primary current ($I_1(t)$) becomes zero.

The main problem with this operating sequence is that when all four switches are turned off ($t_o$, $t_2$), the energy stored in the leakage inductance of the power transformer causes severe ringing with the junction capacitances of the switching devices.

To minimize the parasitic ringing as shown in FIG. 3, the gate signals for switches $Q_2$ and $Q_4$ are delayed (phase-shifted) with respect to those of $Q_1$ and $Q_3$, so that during the time interval $t_2$–$t_3$ and $t_7$–$t_8$ when the secondary voltage is zero, one of the primary switches is always left on. This provides a low-impedance path for the current of the transformer leakage inductance $L_l$ to circulate, thus solving the problem of the parasitic ringing associated with the conventional PWM control hard-switching FB converter (FIGS. 1 and 2).

However, when switch $Q_1$ is turned off at time $t_1$ (switch $Q_3$ at time $t_6$), the primary current $I_1$, which is the sum of the reflected output current $nI_o$ and the transformer primary magnetizing current Im, circulates through $Q_2$ and $D_3$ during freewheeling mode $t_1$–$t_3$ and decrease with a slope of the following equation (1):

$$\frac{dI_1(t)}{dt} = \frac{-V_o}{L_1 + n^2 L_f} \qquad (1)$$

wherein n is a turns ratio of the transformer given as n=Ns/Np.

Due to this circulating current, RMS current stress, conduction losses of the transformer and switching devices are increased. The overall efficiency is also reduced.

SUMMARY OF THE INVENTION

The present invention is based on the object of providing a full bridge PWM DC/DC converter which minimizes the commutating and circulating current flowing through the transformer and switching devices. By applying an energy recovery snubber (ERS or ERS1), the converter achieves nearly zero current switching for the right legs $Q_2$ and $Q_4$ of the converter and obtains zero voltage switching for the left legs $Q_1$ and $Q_3$ of the converter.

Further, the converter achieves soft switching for the secondary side rectifiers $D_{5,1}$, $D_6$ and $D_7$. A circuit analysis and experiment according to the invention are performed to verify the topology by implementing a 7kw (12 VDC, 58 A), 30 kHz Insulated Gate Bipolar Transistor (IGBT) based experimental circuit.

This invention solves the above described problems—RMS current stress and conduction losses and so on associated with the conventional high frequency DC/DC converter. A high frequency, soft switching Full Bridge DC/DC converter free from a circulating current includes an energy recovery snubber attached to the secondary side of the transformer.

The energy recovery snubber (ERS or ERS1) of the present invention recovers the switching losses of the transformer secondary side to the load. It has three fast recovery diodes $Ds_1$, $Ds_2$, and $Ds_3$, two capacitors $Cs_1$ and $Cs_2$, and a small resonant inductor Lr. The small resonant inducter Lr may be ignored or removed because the transformer leakage inductance $L_l$ may be used instead of inserting the small resonant inducer Lr in to the circuit.

The energy stored in the snubber capacitors $Cs_1$, $Cs_2$ during conduction mode begins discharging when the transformer secondary voltage in the freewheeling intervals becomes zero. Due to the discharging of the snubber capacitors $Cs_1$ and $Cs_2$, the output rectifiers $D_5$ and $D_6$ are reverse biased and the secondary windings of the transformer are open. Both primary and secondary currents in the transformer become zero.

Only a low magnetizing current Im circulates through $D_3$ and $Q_2$ during the freewheeling interval. Thus, the RMS current for the transformer and switches is considerably reduced during the freewheeling interval. The overall efficiency can be increased by the resultant lowered conduction losses. Additionally, the converter achieves nearly zero current switching for the right legs $Q_2$ and $Q_4$ due to the minimized circulating current during a right leg transition interval, and achieves zero-voltage-switching ZVS for the left legs $Q_1$ and $Q_3$ due to the reflected output current ($nI_o$=$It_1$, n=Ns/Np) during a left leg transition interval.

The converter achieves soft switching for secondary side rectifiers $D_5$ and $D_6$ and freewheeling diode $D_7$ because at the turn-on time of switches $Q_1$, $Q_2$, and $Q_3$, $Q_4$, the energy recovery snubber provides a low impedance path, for example the path of transformer→snubber capacitor $Cs_1$→snubber diode $Ds_3$→a small resonant inductor Lr (which can be ignored)→snubber capacitor $Cs_2$.

BRIEF DESCRIPTION OF THE DRAWINGS

The circulating current free type, high frequency, soft switching PWM Full Bridge DC/DC converter according to the present invention will be described in detail below with reference to embodiments shown in the accompanying drawings, in which:

FIGS. 6(a), 6(b), 6(c), 6(d), 6(e), 6(f) show circuit configurations for the six operating modes of FIG. 4, with FIG. 6(a) showing Mode 0: $Q_1$ $Q_2$ conducting and $Cs_1$, $Cs_2$ charging; FIG. 6(b) showing Mode 1: $Q_1$ $Q_2$ conducting (powering mode); FIG. 6(c) showing Mode 2: the left leg transition; FIG. 6(d) showing Mode 3: the freewheeling mode with $Cs_1$, $Cs_2$ discharging; FIG. 6(e) showing Mode 4: the right leg transition; FIG. 6(f) showing Mode 5: $Q_4$, $Q_3$ conducting and $Cs_1$, $CS_2$ charging;

FIGS. 12(a) and 12 (b) show wave forms of the conventional phase-shift ZVS FB DC/DC converter with RCD snubber ERS in FIGS. 1 and 3 wherein FIG. 12(a) depicts the voltage and current waveforms present on the primary side of the transformer and FIG. 12(b) depicts the voltage and current waveforms present on the secondary side of the transformer.

FIGS. 13(a) and 13(b) show wave forms of the phase-shifted FB DC/DC converter with energy recovery snubber (ERS) in FIGS. 4 and 5 wherein FIG. 13(a) depicts the voltage and current waveforms present on the primary side of the transformer and FIG. 13(b) depicts the voltage and current waveforms present on the secondary side of the transformer;

FIGS. 14(a) and 14(b) show wave forms of the soft switching FB DC/DC converter with energy recovery snubber (ERS) (without a resonant inductor) in FIG. 7 wherein FIG. 14(a) depicts the voltage and current waveforms present on the primary side of the transformer and FIG. 14(b) depicts the voltage and current waveforms present on the secondary side of the transformer;

DETAILED DESCRIPTION OF THE PREFERRED EMBODIMENTS

Figure 4:
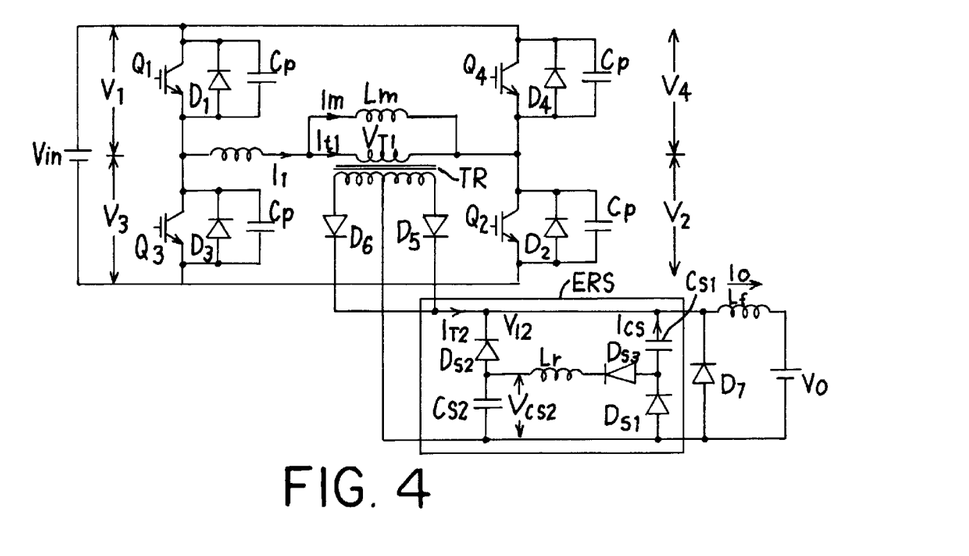
FIG. 4 shows a circuit of a high frequency, soft switching phase-shifted full bridge DC/DC converter with energy recovery snubber (center-tapped transformer) having a circulating current free type, according to the present invention.
Figure 5:
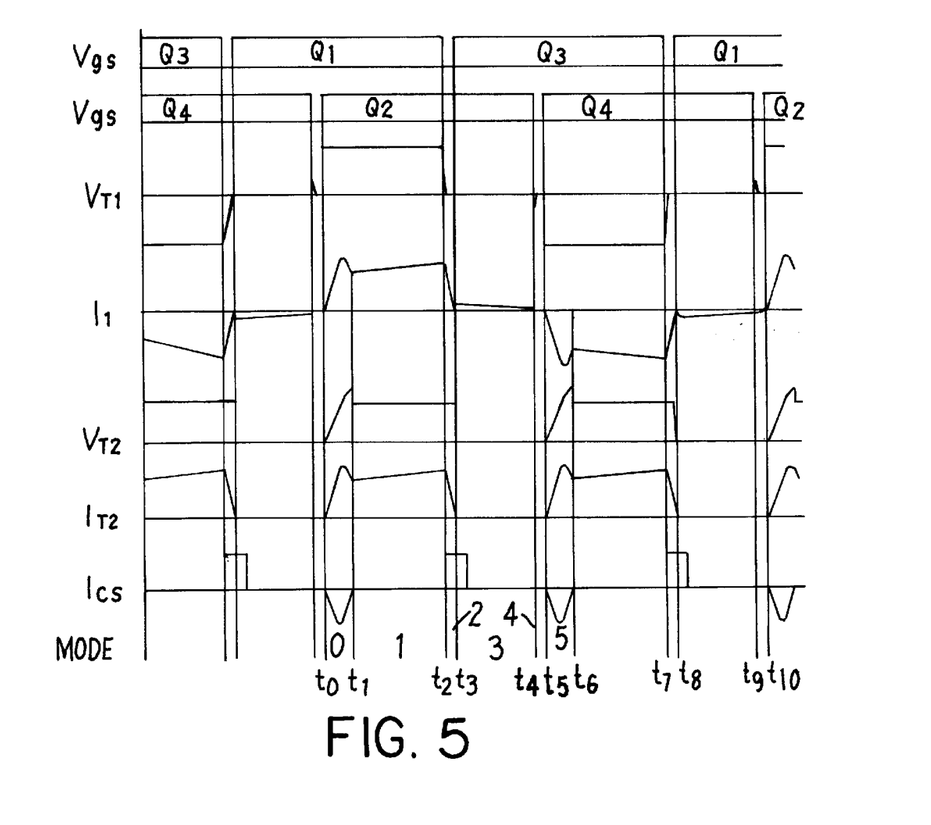
FIG. 5 shows the principal operation wave forms of the FIG. 4 circuit.

This invention will be now described with reference to the accompanying drawings. FIGS. 4 and 5 show a circulating current free type high frequency, soft switching, phase-shifted full bridge DC/DC converter that applies an energy recovery snubber (ERS) to minimize circulating current and their principal wave forms. A detailed circuit configuration of the power stage follows. Four switches $Q_1$–$Q_4$ form the full bridge with the power transformer.

The secondary side of high frequency transformer is center-tapped (or single-tapped) with output rectifiers. output inductor $L_f$ and output capacitor $C_o$ are used to smooth output current $I_o$ and output voltage $V_o$. The energy recovery snubber has three fast recover diodes $Ds_1$, $Ds_2$ and $Ds3$, two resonant capacitor $Cs_1$ and $Cs_2$, and a small resonant inductor Lr. The small resonant inductor Lr can be ignored because the transformer leakage inductance $L_l$ is used instead of inserting the small resonant inductor Lr. The energy recovery snubber is inserted between the transformer secondary side rectifier $D_5$ and $D_6$ and the output inductor Lf to reduce the circulating current.

By using the energy recovery snubber instead of adding a tapped inductor and a saturable reactor to reduce RMS current stress such as described in references(S. Hamada, Y. Maruyama, M. Nakaoka, "Saturable Reactor Assisted Soft-Switching Technique in PWM DC-DC Converters", PESC, 1992; and S. Hamada, M. Michihira, M. Nakaoka, "Using A Tapped Inductor for Reducing Conduction Losses in a Soft Switching PWM DC-DC Converter", EPE, 1993), the converter can reduce the circulating current flowing during freewheeling intervals $t_3$–$t_4$ and $t_8$–$t_9$.

As shown in FIG. 5, the energy stored in the snubber capacitors $Cs_2$ and $Cs_1$ during conduction mode ($t_o$–$t_2$, $t_5$–$t_7$) starts discharging when the transformer secondary voltage in the freewheeling intervals becomes zero. Due to the discharging of the snubber capacitor $Cs_1$ and $Cs_2$, the rectifiers $D_5$ and $D_6$ are reverse-biased and the secondary windings of the transformer are opened. Therefore, both primary and secondary currents of the transformer become zero. Only a low magnetizing current Im circulates through $D_3$ and $Q_2$ during freewheeling interval in mode 3, shown in FIG. 6.

Thus, the RMS current through the transformer and switches is considerably reduced in the freewheeling intervals $t_3$–$t_4$ and $t_8$–$t_9$. Hence, the converter achieves nearly zero current switching for the right legs $Q_2$ and $Q_4$ due to the minimized circulating current during the interval of right leg transition $t_4$–$t_5$, and achieves zero voltage switching for the left legs $Q_1$ and $Q_3$ due to the reflected output current ($nI_o=It_1$, $n=Ns/Np$) during the interval of left leg transitions $t_2$–$t_3$. Also, the converter achieves soft switching for secondary side rectifiers $D_5$ and $D_6$ and freewheeling diode $D_7$ because at the turn-on time of switches $Q_1$, $Q_2$ and $Q_3$, $Q_4$, the energy recovery snubber provides a low impedance path such as: transformer→snubber capacitor $Cs_1$→snubber diode $Ds_3$→a small resonant inductor Lr (which can be ignored in this application)→snubber capacitor $Cs_2$.

A snubber adopted in this invention recovers the switching losses to the load. As the diode $Ds_2$ is reverse-biased with zero initial conditions for the passive elements, the circuit operation of the invented circulating current free type, soft switching Full Bridge DC/DC converter is described as follows.

Figure 6A:
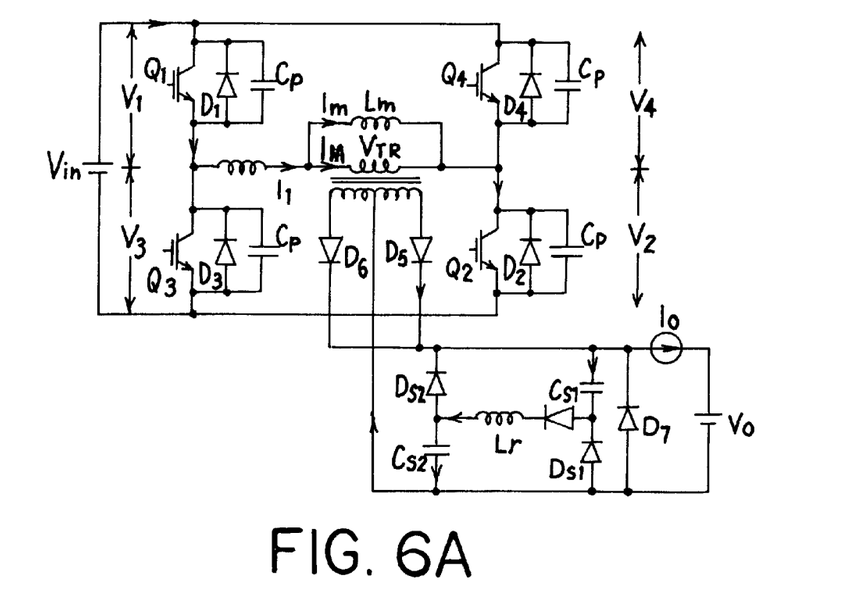

Mode 0: The reflected primary current ($It_1/n$) begins to flow to $Cs_1$, Lr (Lr can be ignored in this application) and $Cs_2$ providing a low impedance path through the transformer and rectifiers $D_5$ and $D_6$ when the switches $Q_1$, and $Q_2$ are conducting during time ($t_o$–$t_1$). During the charging process, if the voltage across $Cs_2$ becomes higher than Vt2 before the current reversing, $Ds_2$ starts conducting and constitutes a new resonant circuit through Lr and $Cs_1$. However, since $Ds_3$ is still reverse-biased, snubber capacitor $Cs_1$ and $Cs_2$ are charged up to the transformer secondary voltage $Vt_2$ evenly and stay charged until mode 2.

$$V_{cs2}(t) = \frac{V_{t2}}{2}\left[1 - \cos\left[\sqrt{\frac{C_{s1} + C_{s2}}{(n^2 L_f + L_r)(C_{s1} \cdot C_{s2})}}\right] \cdot t\right] \quad (2)$$

Also, the converter is transferring input power to the secondary side through transformer, $D_6$, $D_5$ and $L_f$.

Figure 6B:
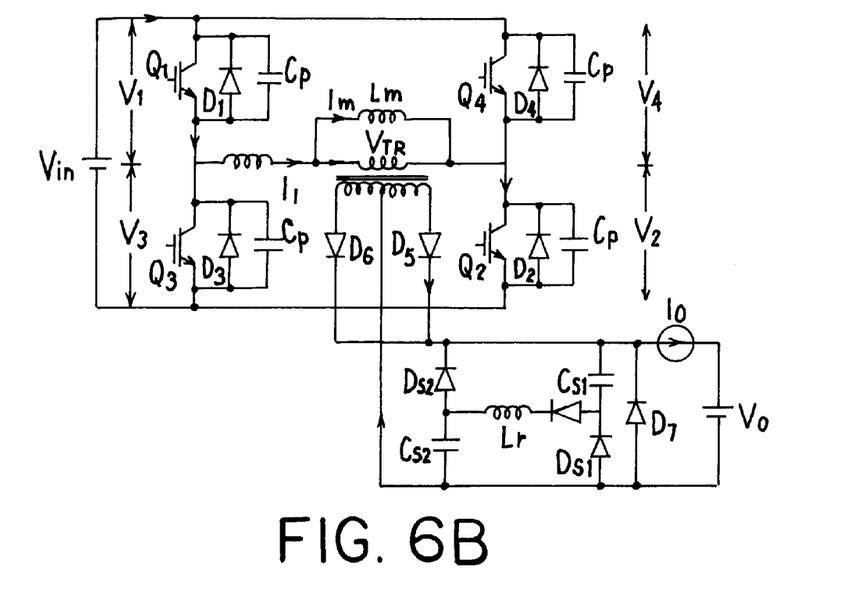

Mode 1: After the snubber capacitors $Cs_1$ and $Cs_2$ are charged up to $Vt_2$ at time $t_1$, the converter transfers only input power to the load. If it is assumed that the output voltage $V_o$ is a constant voltage source during this mode (energy transferring mode), the transformer primary current is increased with the slope of equation (3).

$$I_1(t) = \frac{V_{in} - \frac{V_o}{n}}{L_l + L_f/n^2} \quad (3)$$

wherein $L_l$ is leakage inductance and $L_f/n^2$ is reflected output filter inductor.

Figure 6C:
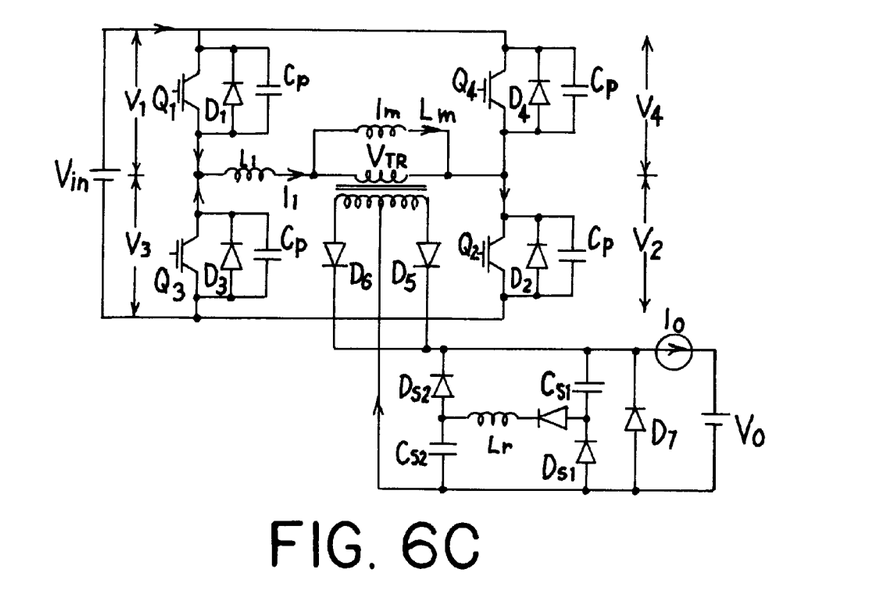

Mode 2: Just before the time $t_2$, the switches $Q_1$ and $Q_2$, and rectifiers $D_5$ and $D_6$ are conducting. When the switch $Q_1$ is turned-off at the time $t_2$, energy stored in the snubber capacitors $Cs_1$ and $Cs_2$ begins discharging, and a circulating current which is the sum of the reflected output current $nI_o$ and a low magnetizing current Im charges the junction capacitance $C_p$ of $Q_1$ and discharges the junction capacitance $C_p$ of $Q_3$ during the time interval $t_2$–$t_3$.

$$V_1(t) \approx \left(\frac{nI_o + I_m}{2C_p}\right)t \quad (4)$$

After the junction capacitance voltage $V_1(t)$ of $Q_1$ reaches input voltage Vin, body diode $D_3$ conducts prior to turn-on of the switch $Q_3$. Therefore, the switches $Q_1$ and $Q_3$ easily achieve zero voltage switching due to the reflected output current $nI_o$ during the interval of the left leg transition $t_2$–$t_3$.

Figure 6D:
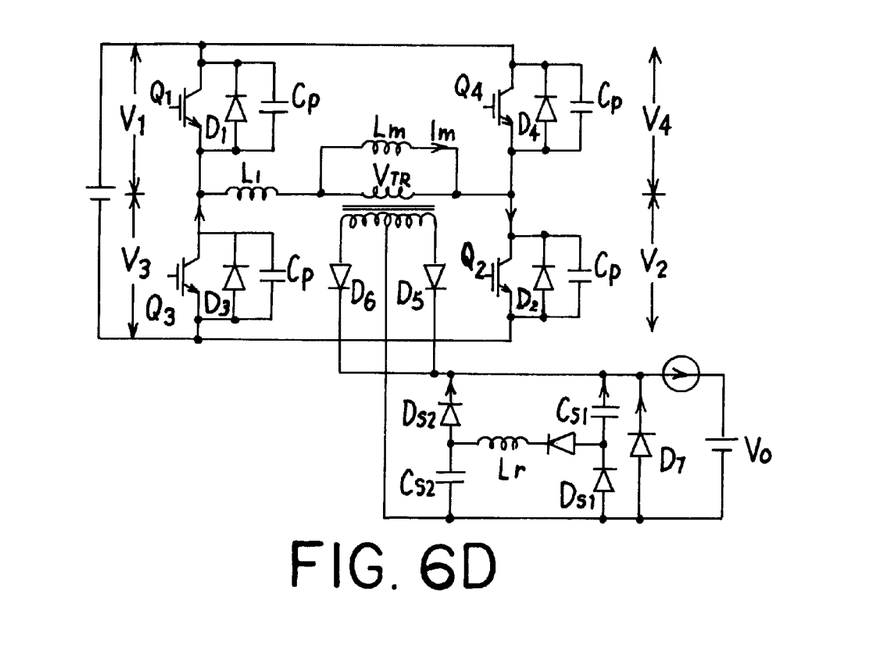

Mode 3: Due to the discharging of the snubber capacitors, $Cs_1$ and $Cs_2$, the rectifiers $D_5$ and $D_6$ are reverse-biased and the secondary windings of the transformer are opened. Therefore, both primary and secondary currents of the transformer become zero. Only a low magnetizing current Im circulates through $D_3$ and $Q_2$. The current $I_o$ in output inductor $L_f$ freewheels first through $Cs_1$, $Cs_2$ and $L_f$, and then freewheels through freewheeling diode $D_7$ and output inductor $L_f$ after snubber capacitors $Cs_1$ and $Cs_2$ are completely discharged. Thus, the RMS current for the transformer and switches is considerably reduced in the freewheeling interval $t_3$–$t_4$.

Figure 6E:
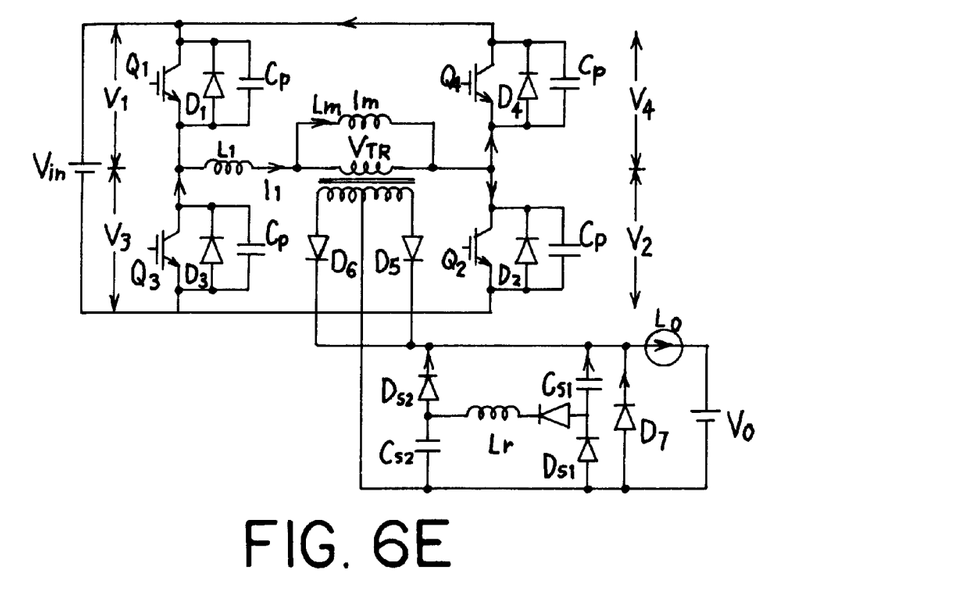

Mode 4: When switch $Q_2$ is turned-off with nearly ZCS and ZVS at the end of freewheeling period $t_4$, the right leg transition starts and only a low magnetizing current Im flowing through the primary transformer transfers little energy to capacitors $C_p$ of the switching devices $Q_2$ and $Q_4$. The stray capacitance voltage $V_2(t)$ of $Q_2$ increases with a slope of equation (5).

$$V_2(t) \approx \left(\frac{I_m}{2C_p}\right) \quad (5)$$

Figure 6F:
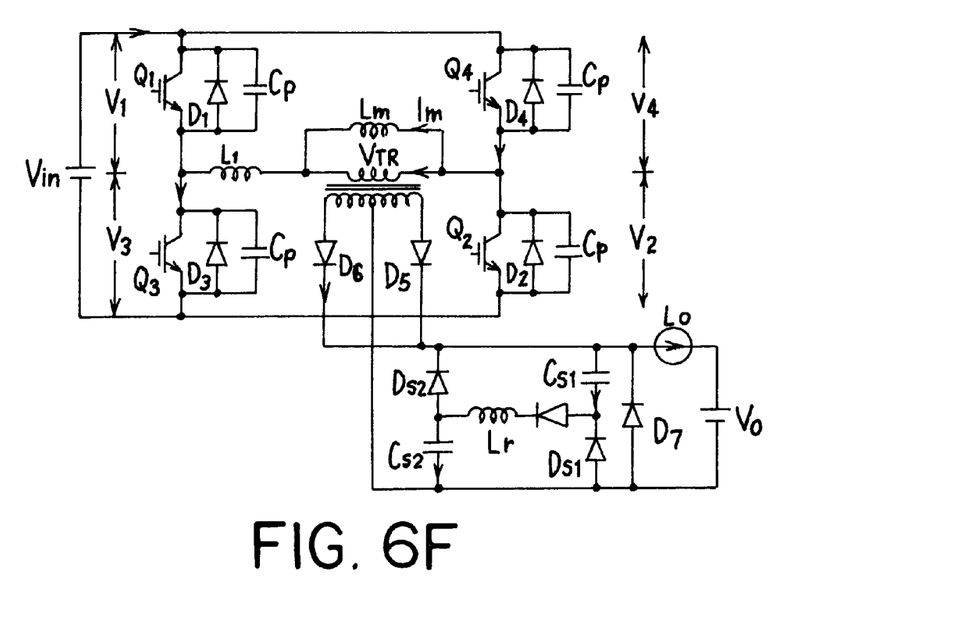

Mode 5: Switch $Q_4$ is also turned-on with ZCS at time $t_5$. Like Mode 0, the reflected primary current $It_1/n$ begins to flow to $Cs_1$, Lr (again Lr can be ignored) and $Cs_2$ provide a low impedance path through transformer and rectifiers $D_5$ and $D_6$ and the input power is transferred to the load.

Figure 7:
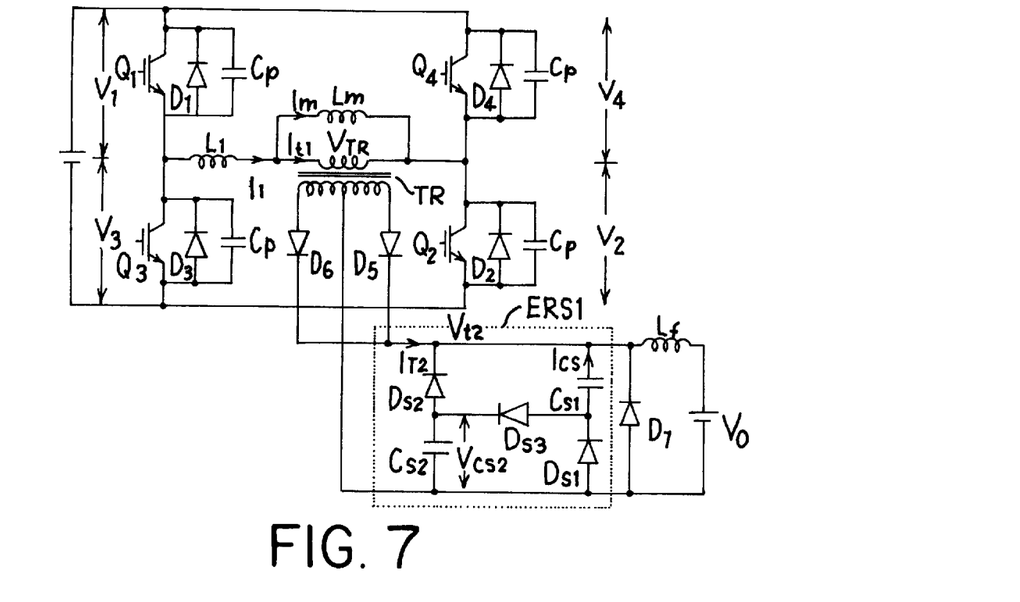
FIG. 7 shows a circuit of a phase-shifted full-bridge DC/DC converter with energy recovery snubber (ERS1) according to the present invention (center-tapped transformer without a snubber inductor)

A circulating current free type, high frequency, soft switching DC/DC converter, according to the invention, has as its main circuit the phase-shifted full bridge DC/DC converter consisting of main switching devices $Q_1$, $Q_2$, $Q_3$ and $Q_4$, center-tapped (or single-tapped as shown FIG. 8) transformer, rectifiers $D_5$ and $D_6$, freewheeling diode $D_7$, output filter $L_f$ and $C_o$, and energy recovery snubber ERS. This circulating free type full bridge DC/DC converter has conduction losses from the switching devices, copper loss in the high frequency transformer, and reverse recovery loss of rectifiers $D_5$ and $D_6$ along with freewheeling diode $D_7$, which should be reduced. The energy recovery snubber attached between the transformer secondary side rectifiers $D_5$ and $D_6$ and output inductor $L_f$ consists of three fast recovery diodes $Ds_1$, $Ds_2$ and $Ds_3$, two capacitors $Cs_1$ and $Cs_2$ and a small resonant inductor Lr (which can be ignored because the transformer leakage inductance $L_l$ is useable instead of inserting a small resonant inductor Lr as shown FIG. 7).

The energy stored in the snubber capacitor $Cs_1$ and $Cs_2$ during conduction intervals $t_o$–$t_2$ and $t_5$–$t_7$ starts discharging when the transformer secondary voltage during freewheeling intervals $t_3$–$t_4$ and $t_8$–$t_9$ becomes zero. Due to the discharging of the snubber capacitors $Cs_1$ and $Cs_2$, the output rectifiers $D_5$ and $D_6$ are reverse-biased and the secondary windings of the transformer are opened. Both primary and secondary currents of the transformer become zero. Only a low magnetizing current Im circulates through $D_3$ and $Q_2$ during freewheeling interval $t_3$–$t_4$ or $D_1$ and $Q_4$ in freewheeling interval $t_8$–$t_9$.

The RMS current through the transformer and switches is considerably reduced in the freewheeling intervals $t_3$–$t_4$ and $t_8$–$t_9$. Therefore, conduction loss of the switching devices and copper loss of the high frequency transformer are reduced. Also, the converter achieves nearly zero current switching for the right leg $Q_2$ and $Q_4$ due to the minimized circulating current during the interval of right leg transition, and achieves zero voltage switching for the left legs $Q_1$ and $Q_3$ due to the reflected output current ($nI_o=It_1$, $n=Ns/Np$) during the interval of left leg transition.

The converter achieves soft switching and reduces a reverse recovery loss for secondary side rectifiers $D_5$ and $D_6$ along with freewheeling diode $D_7$ because at the turn-on time of switches $Q_1$, $Q_2$ and $Q_3$, $Q_4$, the energy recovery snubber ERS provides a low impedance path such as transformer→snubber capacitor $Cs_1$→snubber diode $Ds_3$→a small resonant inductor Lr (which can be ignored)→snubber capacitor $Cs_2$.

The circulating current free type, high frequency, phase-shifted full bridge (or half bridge) DC/DC converter according to the invention is able to apply the energy recovery snubber ERS1 as shown in FIG. 7, FIG. 9, FIG. 10 and FIG. 11 in which a small resonant inductor Lr is not included. Due to use of the energy recovery snubber ERS1, the invented converter reduces the conduction losses in the primary side because output rectifiers $D_5$ and $D_6$ are reverse-biased and the secondary windings of the transformer TR are opened by blocking the voltage of the snubber capacitors $Cs_1$ and $Cs_2$ during the discharging mode thereof. Also, the converter with energy recovery snubber ERS1 does not generate the severe parasitic ringing or create diode reverse recovery loss in the secondary side because the energy recovery snubber ERS1 provides a low impedance path such as transformer→snubber capacitor $Cs_1$→snubber diode $Ds_3$→snubber capacitor $Cs_2$ during the conduction mode. However, the converter has a minor drawback wherein the secondary side voltage $Vt_2$ is slightly increased as shown in the experimental wave-forms of FIG. 14.

The circulating current free type, high frequency, phase-shifted full bridge DC/DC converter of the invention has 6 operating modes in order to achieve soft switching and the reduced conduction loss, and has operational wave-forms corresponding with the above modes as shown FIG. 5 and FIG. 6.

Figure 8:
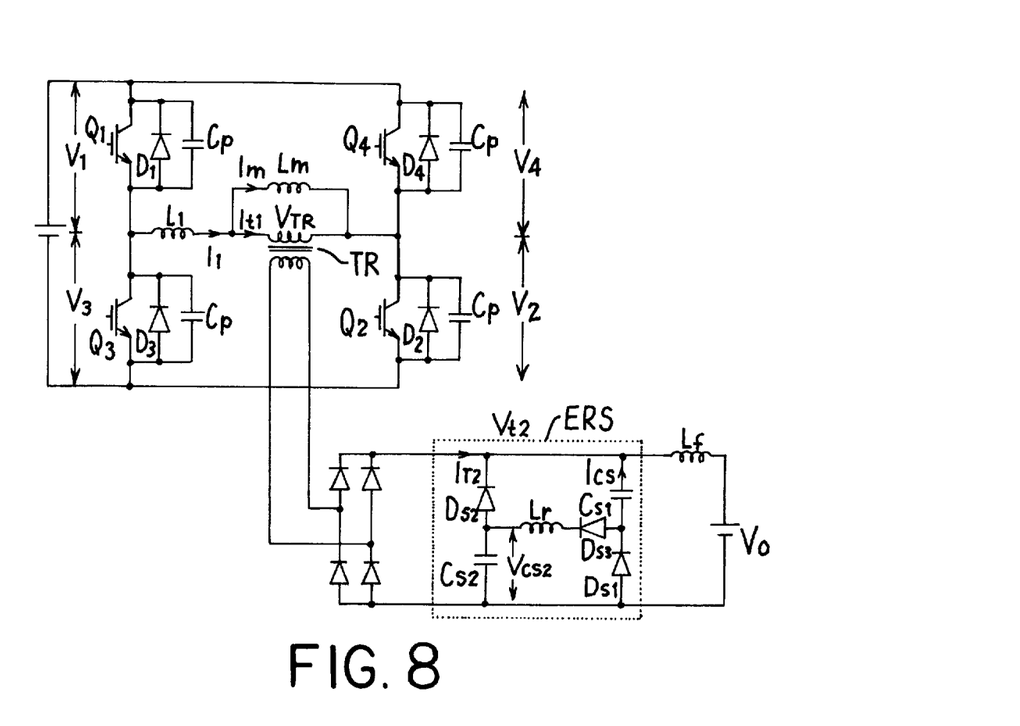
FIG. 8 shows a circuit of a phase-shifted full bridge DC/DC converter with energy recovery snubber (ERS) according to the present invention (single-tapped transformer with the snubber inductor)
Figure 9:
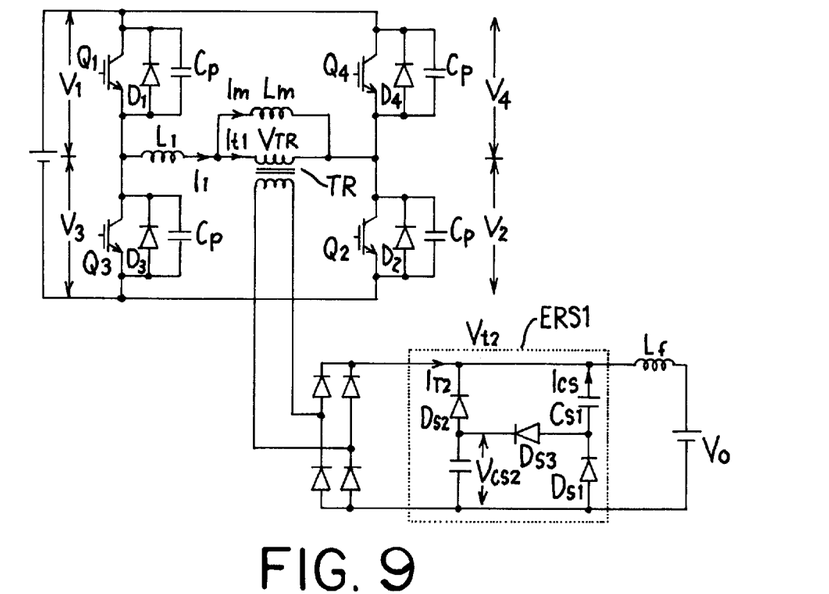
FIG. 9 shows a circuit of a phase-shifted full-bridge DC/DC converter with energy recovery snubber (ERS1) according to the present invention (single-tapped transformer without a snubber inductor)
Figure 10:
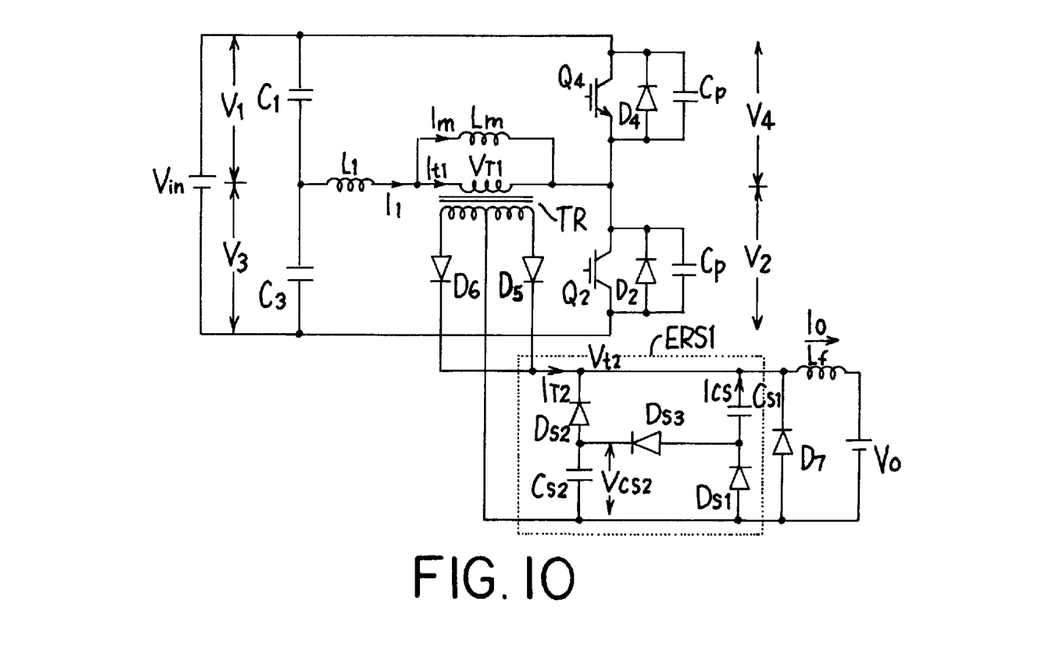
FIG. 10 shows a circuit of a half-bridge DC/DC converter with energy recovery snubber (ERS1) according to the present invention (center-tapped transformer without a snubber inductor)
Figure 11:
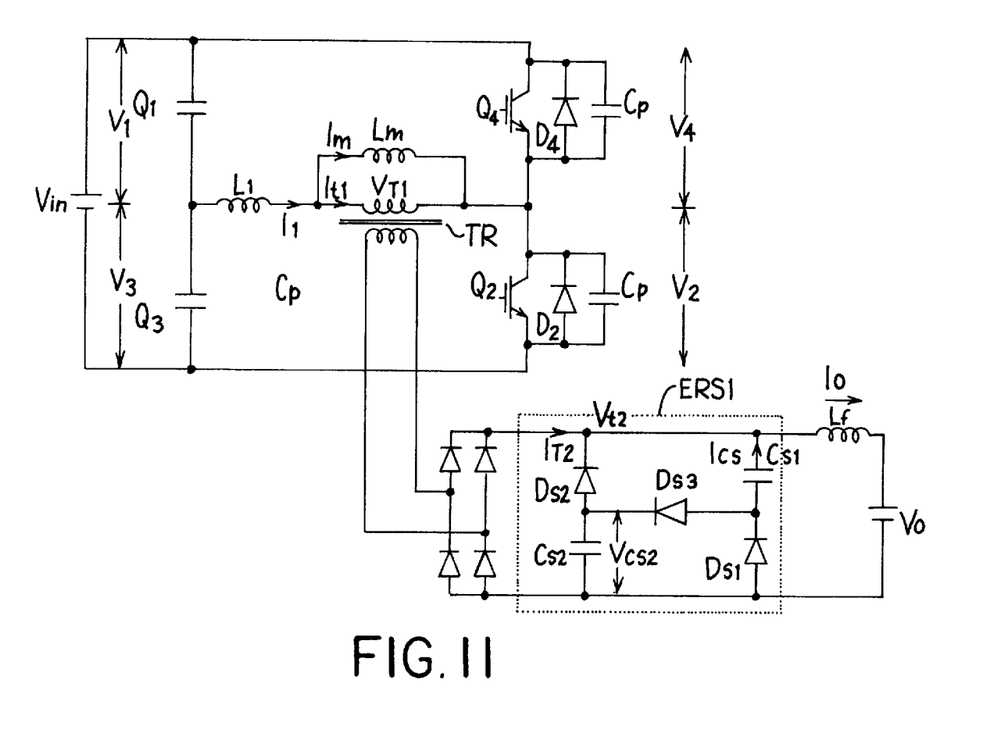
FIG. 11 shows a circuit of a half-bridge DC/DC converter with energy recovery snubber (ERS1) according to the present invention (single-tapped transformer) without a snubber inductor.

The circulating current free type, high frequency, soft switching, phase-shifted full bridge DC/DC converter of this invention is able to use not only center-tapped transformer (FIG. 4, FIG. 7 and FIG. 10) but also single-tapped transformer (FIG. 8, FIG. 9 and FIG. 11).

The half bridge DC/DC converter, as shown in FIG. 10 and FIG. 11, is connect the energy recovery snubber ERS1 between the transformer secondary side rectifiers $D_5$ and $D_6$ and output inductor $L_f$ to achieve soft switching and to reduce reverse recovery losses for main switching devices $Q_1$ and $Q_2$ secondary side rectifiers $D_5$ and $D_6$ and freewheeling diode $D_7$.

According to the present invention, experimental results are shown as in the followings: A 7Kw (120VDC, 58A), 30kHz IGBT based experimental circuit has been implemented to demonstrate the operation. The parameters of the circuit are as follows:

$Q_1$–$Q_4$: IGBT (2MBI120L060, 600V, 200A)

$D_1$–$D_4$: Body diodes of IGBT $C_p$: 14 nF (stray capacitance of IGBT)

Lm: 286 uH (magnetizing inductance of transformer)

$L_l$: 3.5 uH (leakage inductance of transformer)

n: Transformer turn ratio (n=Ns/Np=6/8=0.75)

$Cs_1$, $Cs_2$: 0.2 uF (snubber capacitor)

Lr: 3 uH (snubber inductor)

$Ds_1$–$Ds_3$: snubber diode $D_5$, $D_6$, $D_7$: Rectifier, freewheeling diode $L_f$: 500 uH (output inductor)

δt: 1.3 us (dead time).

Figure 12A:
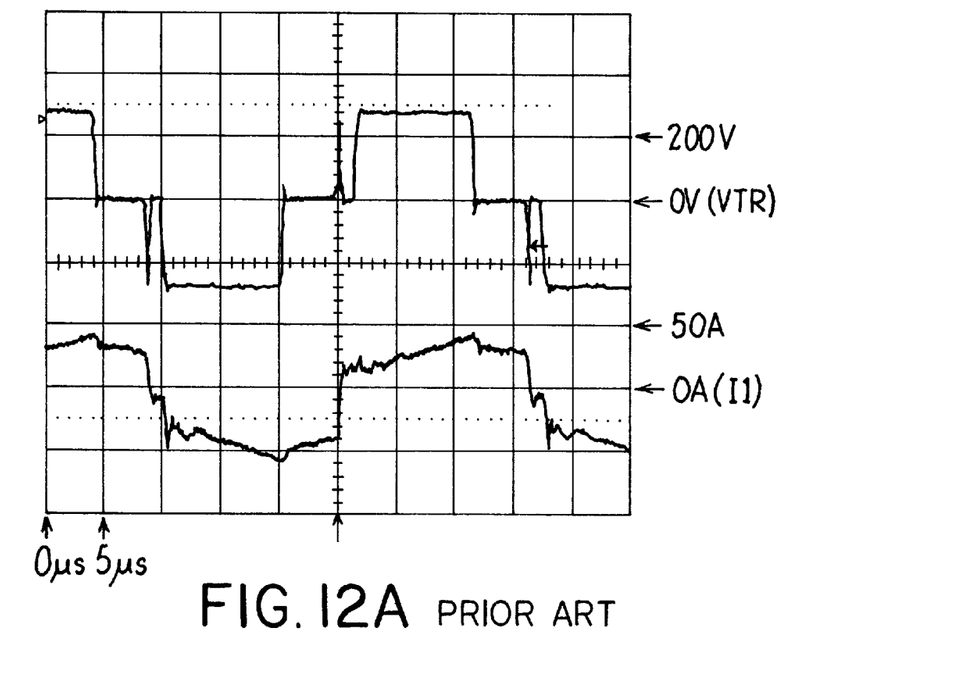
Figure 12B:
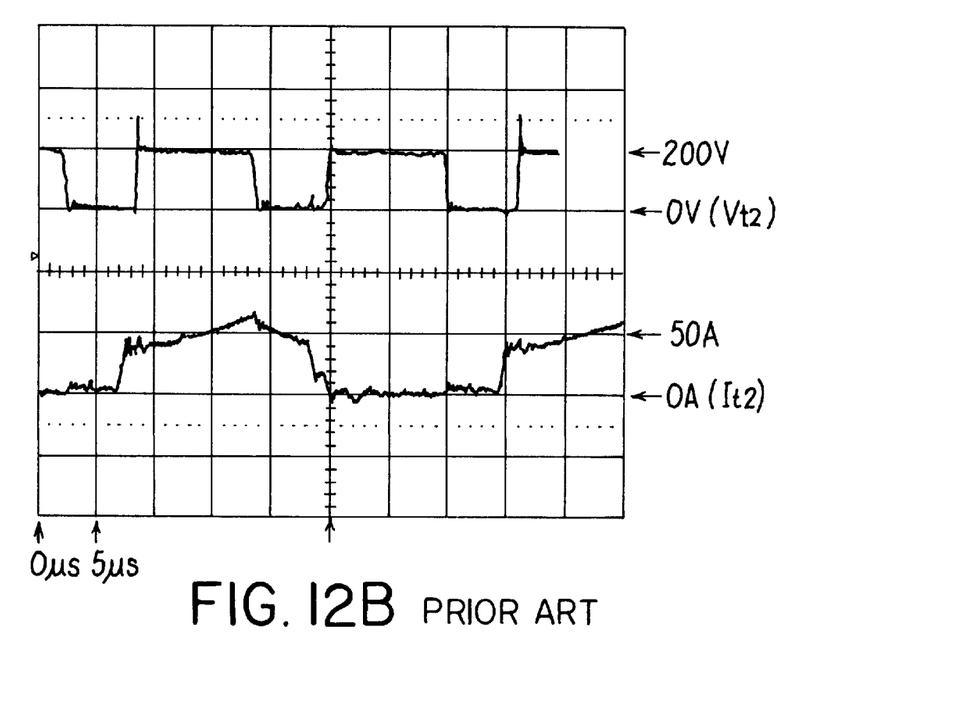
Figure 13A:
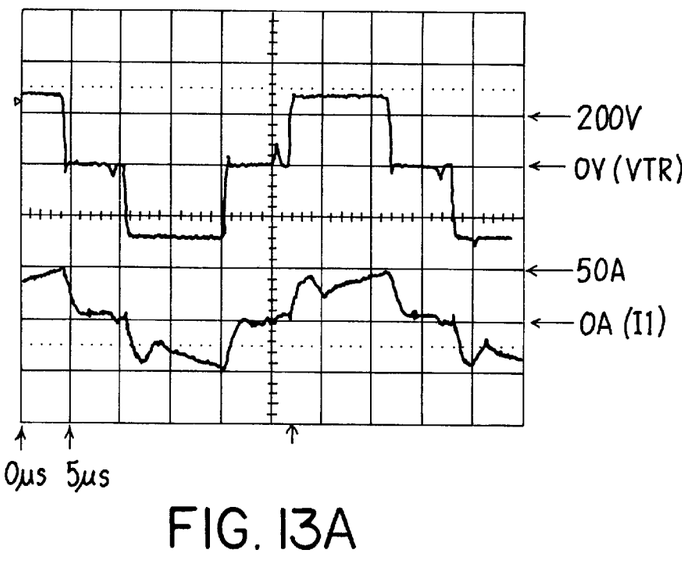
Figure 13B:
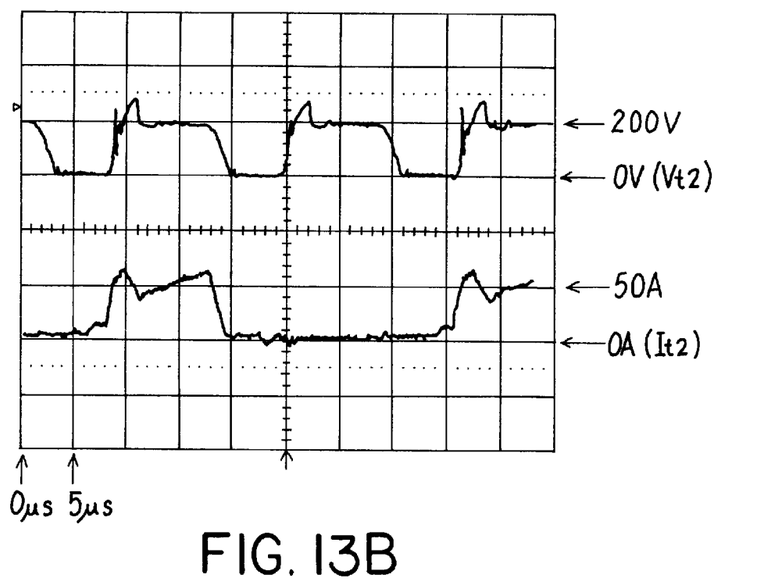
Figure 14A:
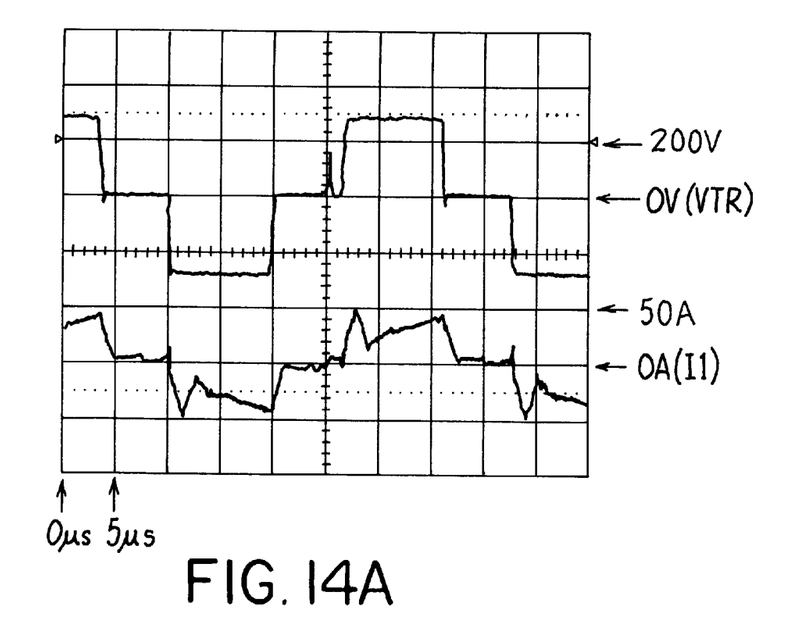
Figure 14B:
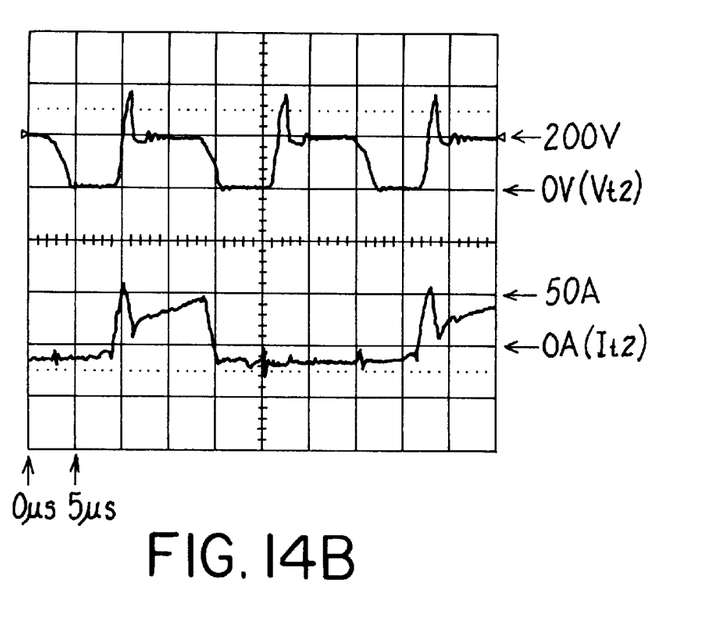

FIG. 12, FIG. 13 and FIG. 14 show the voltage and current wave-form of the primary and secondary side of transformer in the converter with a RCD snubber (FIG. 1 and FIG. 3) and the converter with an energy recovery snubber (FIG. 4, 5 and FIG. 7), respectively. Comparing FIG. 12 with FIG. 13 and FIG. 14, it can be seen that by using an energy recovery snubber ERS or ERS1, the circulating current $I_1$, decreases nearly to zero and only a low magnetizing current Im is flowing during the freewheeling interval. Also, due to the reduced circulating current, soft switching is achieved without peak voltage and severe ringing from a light load to a full load.

Figure 15:
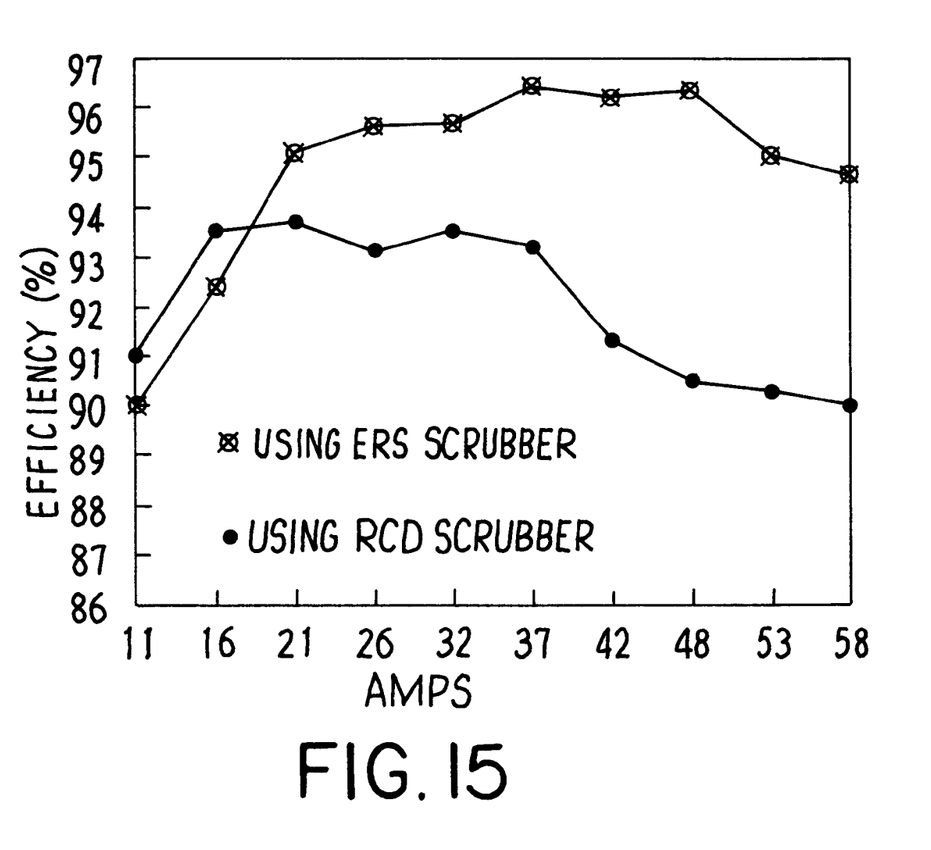
FIG. 15 shows the efficiency by comparing the invented DC/DC converter with the conventional ZVS DC/DC converter wherein the Vin applied to each converter is 280 VDC and Vout is 120 VDC.

FIG. 15 shows the measured efficiency of the proposed soft switching DC/DC converter in comparison with the conventional ZVS DC/DC converter. The efficiency of the invented converter with an energy recovery snubber shows especially a low efficiency characteristics in a light load state (below 16 A) even though the circulating current is reduced during the freewheeling interval. The reduced efficiency characteristics in the light load state is due to the charging current flowing through the snubber capacitors. However, when the load current is increased above 16A, the efficiency of the invented converter with an energy recovery snubber shows some improvement (2% –4%) over the conventional ZVS DC/DC converter due to reduced circulating current and application of the non-dissipated snubber.

The converter according to the present invention can minimize the commutating and circulating current flowing from the transformer and switching devices. By applying an energy recovery snubber, the converter achieves nearly zero current switching for the right legs $Q_2$ and $Q_4$ and achieves zero voltage switching for the left legs $Q_1$ and $Q_3$.

Further, the converter achieves soft switching for the secondary side rectification diodes $D_7$, $D_5$ and $D_6$. A circuit analysis and experiment are performed to verify the proposed topology by implementing a 7 kW(120 VDC,58 A), 30 kHz IGBT based experimental circuit.

What I claim is:

1. A DC/DC converter comprising:
   a DC/DC converter circuit including:
   first and second switching transistors that are series-connected together across terminals for receiving an input voltage;
   third and fourth switching transistors that are series-connected to each other and that are connected in parallel across said first and second switching transistors;
   a transformer through which a circulating current flows having a primary winding that is connected between a junction of said first and second switching transistors and a junction of said third and fourth switching transistors and a secondary winding, said secondary winding having a center tap;
   first and second rectifying diodes, each said rectifying diode having an anode attached to a separate end of said secondary winding;
   a freewheeling diode having a cathode connected to cathodes of said rectifying diodes, and an anode connected to said center tap of said secondary winding;
   an output filter connected at one end to a cathode of said freewheeling diode; and
   an energy recovery snubber connected between said rectifying diodes and said output filter, said energy recovery snubber including:
   a first snubber diode and a first snubber capacitor that are series connected together and that are connected across said freewheeling diode wherein an anode of said first snubber diode is connected to an anode of said freewheeling diode, and one end of said first snubber capacitor is connected to said cathode of said freewheeling diode;

a second snubber diode and a second snubber capacitor that are series connected together and that are connected across said freewheeling diode wherein a cathode of said second snubber diode is connected to said cathode of said freewheeling diode, and one end of said second snubber capacitor is connected to said anode of said freewheeling diode;

a third snubber diode connected in a forward biased orientation between a junction of said first snubber diode and said first snubber capacitor and a junction of said second snubber diode and said second snubber capacitor, so that said snubber capacitors are charged during conduction modes and discharged during freewheeling modes, said first and second rectifying diodes being reverse biased when said capacitors are discharged so that said secondary winding is opened so that, in the freewheeling mode, the circulating current flow through said secondary winding falls to zero so as to cause a reduction in current flow through said primary winding, said energy recovery snubber being free from a snubber inductor.

2. The DC/DC converter of claim 1, wherein the first and second snubber capacitors have a value of 0.2 $\mu$ f.

3. A half-bridge DC/DC converter comprising:
a DC/DC converter circuit including:
first and second bridge capacitors that are series-connected together across terminals for receiving an input voltage;
first and second switching transistors that are series-connected to each other and that are connected in parallel across said first and second bridge capacitors;
a transformer through which a circulating current flows having a primary winding that is connected between a junction of said first and second bridge capacitors and a junction of said first and second switching transistors and a secondary winding, said secondary winding having a single tap;
first and second rectifying diodes, said first and second rectifying diodes having anodes attached to a separate end of said secondary winding and cathodes connected to each other;
third and fourth rectifying diodes, said third and fourth rectifying diodes having cathodes attached to separate ends of said secondary winding, and anodes connected to each other;
an output filter connected at one end to said cathodes of said first and second rectifying diodes and at another end to said anodes of said third and fourth rectifying diodes; and
an energy recovery snubber connected between said rectifying diodes and said output filter, said energy recovery snubber including:
a first snubber diode and a first snubber capacitor that are series connected together across said output filter wherein an anode of said first snubber diode is connected to said anodes of said third and fourth rectifying diodes, and one end of said first snubber capacitor is connected to the cathodes of said first and second rectifying diodes;
a second snubber diode and a second snubber capacitor that are series connected together and that are connected across said output filter wherein a cathode of said second snubber diode is connected to said cathodes of said first and second rectifying diodes, and one end of said second snubber capacitor is connected to said anodes of said third and fourth rectifying diodes; and
a third snubber diode connected in a forward biased orientation between a junction of said first snubber diode and said first snubber capacitor and a junction of said second snubber diode and said second snubber capacitor, said energy recovery snubber being free from a snubber inductor and free from a freewheeling diode.

4. The DC/DC converter of claim 3, wherein said transformer has a turn ratio of 0.75.

5. The DC/DC converter of claim 3, wherein said first and second snubber capacitors have a value 0.2 $\mu$ f.

6. A half-bridge DC/DC converter comprising:
a DC/DC converter circuit including:
first and second bridge capacitors that are series-connected together across terminals for receiving an input voltage;
first and second switching transistors that are series-connected to each other and that are connected in parallel across said first and second bridge capacitors;
a transformer through which a circulating current flows having a primary winding that is connected between a junction of said first and second switching transistors and a secondary winding, said secondary winding having a center tap;
first and second rectifying diodes, each said rectifying diode having an anode attached to a separate end of said secondary winding;
a freewheeling diode having a cathode connected to cathodes of said rectifying diodes, and an anode connected to said center tap of said secondary winding;
an output filter connected at one end to a cathode of said freewheeling diode; and
an energy recovery snubber connected between said rectifying diodes and said output filter, said energy recovery snubber including:
a first snubber diode and a first snubber capacitor that are series connected together and that are connected across said freewheeling diode wherein an anode of said first snubber diode is connected to an anode of said freewheeling diode, and one end of said first snubber capacitor is connected to said cathode of said freewheeling diode;
a second snubber diode and a second snubber capacitor that are series connected together and that are connected across said freewheeling diode wherein a cathode of said second snubber diode is connected to said cathode of said freewheeling diode, and one end of said second snubber capacitor is connected to said anode of said freewheeling diode;
a third snubber diode connected in a forward biased orientation between a junction of said first snubber diode and said first snubber capacitor and a junction of said second snubber diode and said second snubber capacitor, so that said snubber capacitors are charged during conduction modes and discharged during freewheeling modes, said first and second rectifying diodes being reverse biased when said capacitors are discharged so that said secondary winding is opened so that, in the freewheeling mode, the circulating current flow through said secondary winding falls to zero so as to cause a reduction in current flow through said primary winding, said energy recovery snubber being free from a snubber inductor.

7. The DC/DC converter of claim 6, wherein the transformer has a turn ratio of 0.75.

8. The DC/DC converter of claim 6, wherein the first and second snubber capacitors have a value 0.2 $\mu$ f.

* * * * *